(12) United States Patent
Tsuji

(10) Patent No.: US 8,810,168 B2
(45) Date of Patent: Aug. 19, 2014

(54) ROTATING MACHINE CONTROLLER

(75) Inventor: Hiroya Tsuji, Yokkaichi (JP)

(73) Assignee: Denso Corporation, Kariya (JP)

( * ) Notice: Subject to any disclaimer, the term of this patent is extended or adjusted under 35 U.S.C. 154(b) by 234 days.

(21) Appl. No.: 13/343,937

(22) Filed: Jan. 5, 2012

(65) Prior Publication Data
US 2012/0176068 A1  Jul. 12, 2012

(30) Foreign Application Priority Data

Jan. 7, 2011  (JP) .................. 2011-002019

(51) Int. Cl.
*H02P 21/14* (2006.01)
*H02P 21/00* (2006.01)

(52) U.S. Cl.
CPC .................. *H02P 21/0035* (2013.01)
USPC ............ 318/400.02; 318/400.01; 318/400.03; 318/701

(58) Field of Classification Search
CPC .................................................. H02P 21/0035
USPC ........... 318/400.02, 400.01, 400.03, 701, 138
See application file for complete search history.

(56) References Cited

U.S. PATENT DOCUMENTS

| | | | |
|---|---|---|---|
| 5,650,706 A | 7/1997 | Yamada et al. | |
| 7,728,541 B2 * | 6/2010 | Subrata et al. | 318/449 |
| 7,986,117 B2 * | 7/2011 | Yamamoto et al. | 318/400.26 |
| 8,154,230 B2 | 4/2012 | Kimura | |
| 2006/0119312 A1 | 6/2006 | Okamura et al. | |
| 2009/0200970 A1 | 8/2009 | Kimura | |
| 2009/0237021 A1 | 9/2009 | Yamamoto et al. | |
| 2009/0322264 A1 | 12/2009 | Imura | |

FOREIGN PATENT DOCUMENTS

| | | |
|---|---|---|
| CN | 1830135 | 9/2006 |
| CN | 101577522 | 11/2009 |
| JP | H08-103093 | 4/1996 |
| JP | P2006-081338 A | 3/2006 |
| JP | 4223880 | 11/2008 |
| JP | 2009-232531 | 10/2009 |
| JP | 2010-011600 | 1/2010 |

OTHER PUBLICATIONS

Office Action (3 pages) dated Dec. 13, 2012 issued in corresponding Japanese Application No. 2011-002019 and English translation (3 pages).
Office Action (7 pgs.) issued Jan. 3, 2014 in corresponding Chinese Application No. 201210003651.7 with an at least partial English-language translation thereof (10 pgs.).

* cited by examiner

*Primary Examiner* — David Luo
(74) *Attorney, Agent, or Firm* — Nixon & Vanderhye PC

(57) ABSTRACT

In a norm setting section, a norm of an output voltage vector of an inverter is set based on a required torque and an electrical angle speed. In a phase setting section, a phase is set as controlled variables for performing a feedback control of an estimated torque to the required torque. In an operation signal generating section, operation signals are generated based on the norm set by the norm setting section and the phase set by the phase setting section, and the signals are outputted to the inverter. Based on the value of the phase, existence of abnormalities of a permanent magnet of a motor-generator is determined.

6 Claims, 3 Drawing Sheets

ROTATING MACHINE CONTROLLER

CROSS-REFERENCE TO RELATED APPLICATION

This application is based on and claims the benefit of priority from earlier Japanese Patent Application No. 2011-2019 filed Jan. 7, 2011, the description of which is incorporated herein by reference.

TECHNICAL FIELD

The present disclosure relates to a rotating machine controller. Particularly to the controller that feedback-controls a torque of the rotating machine to a required torque by operating a voltage applying circuit that applies voltage to the rotating machine equipped with a permanent magnet.

BACKGROUND

A controller that sets a norm of an output voltage vector of an inverter is proposed using a map that defines a relation between a required torque and a revolving speed for a three-phase electric motor equipped with a permanent magnet, and a norm of an output voltage vector of a voltage applying circuit (inverter) as disclosed in Japanese Patent Application Laid-Open Publication No. 2009-232531, for example.

Here, a phase of the output voltage of the inverter is defined by controlled variables of torque feedback control.

By the way, when an abnormality that is a decrease of magnetic flux in the permanent magnet equipped in the electric motor, or what is called demagnetization occurs, inconvenience such as a decrease of an actual torque relative to the required torque arises.

For this reason, a technology that determines the decrease of magnetic flux in the permanent magnet, or so-called existence of demagnetization is disclosed in Japanese Patent No. 4223880, for example.

Specifically, when using command voltage as the controlled variables for performing current feedback control so that command current becomes the required torque for three-phase electric motor, the existence of demagnetization is determined based on a difference of the command voltage and a standard value.

However, in a technology of defining the norm of an output voltage vector unambiguously according to a required torque disclosed in the above-mentioned Publication No. 2009-232531, it is difficult to determine the existence of demagnetization based on the norm of the output voltage vector.

SUMMARY

An embodiment provides a rotating machine controller that can determine existence of abnormalities of magnetic flux of a permanent magnet when operating a voltage applying circuit that applies voltage to the rotating machine that feedback-controls a torque of the rotating machine equipped with the permanent magnet to a required torque.

In a rotating machine according to a first aspect, the rotating machine includes a norm setting means that sets a vector norm of an output voltage of the voltage applying circuit, a phase control means that controls a phase of the output voltage of the voltage applying circuit so that a torque of the rotating machine is feedback-controlled to the required torque, and an abnormality determination means that determines whether abnormalities arise in a magnetic flux of the permanent magnet based on the phase controlled by the phase control means.

When the magnetic flux of the permanent magnet changes under the situation where the norm is set, the torque changes due to the current that flows through the rotating machine changing.

For this reason, since a control of the phase that originated in the change of the magnetic flux of the permanent magnet by the phase control means is performed, it is considered that the phase of the output voltage vector reflects the existence of the abnormalities of magnetic flux of the permanent magnet.

From this point of view, the existence of the change of magnetic flux is determined based on the phase in the above-mentioned disclosure.

In the rotating machine according to a second aspect, the rotating machine further includes a region setting means that sets a normal region of the phase controlled by the phase control means using at least two parameters among the vector norm of the output voltage, a revolving speed of the rotating machine, and the required torque as inputs.

The abnormality determination means determines that abnormalities have arisen in the magnetic flux of the permanent magnet based on the phase controlled by the phase control means departing from the normal region.

In the above-mentioned disclosure, the information regarding the existence of the abnormalities of the magnetic flux of the permanent magnet can be extracted appropriately from the phase by having the region setting means.

In the rotating machine according to a third aspect, the rotating machine controller has a limiting means that limits the phase, using the phase control means, to be with in a permissible range.

The abnormality determination means determines that abnormalities have arisen in the magnetic flux of the permanent magnet based on the phase set by the phase control means within a suitable value of the permissible range.

The operating region of the motor is required to have a 1 to 1 relation between the phase and the torque.

Therefore, it is desirable to have the limiting means to limit an operation region and the permissible range of the phase when adopting the phase control means.

In addition, when the abnormalities arise in the magnetic flux in this case, it is considered that the phenomenon in which the phase remains within the suitable value of the permissible range also arises.

In the third aspect of the disclosure, from this point of view, it is determined that it is abnormal when the phase remains within the suitable value of the permissible range.

In the rotating machine according to a fourth aspect, the abnormality determination means determines that abnormalities have arisen in the magnetic flux if the norm set by the norm setting means is substantially constant.

It is considered that the phase is fluctuated due to various influences unlike the regular time of the norm is constant at the transient period to which the norm is not constant.

It is difficult to detect the abnormalities of the magnetic flux from the phase in this case.

Therefore, such a condition is established from this point of view in the fourth aspect of the disclosure.

In the rotating machine according to a fifth aspect, the voltage applying circuit is an AC-DC bi-directional converter disposed with switching elements that connect terminals of the rotating machine to a positive pole and a negative pole of a direct-current power supply alternately.

DETAILED DESCRIPTION OF THE PREFERRED EMBODIMENTS

<First Embodiment>

With reference to the drawings, hereinafter will be described a first embodiment of the present disclosure applied to a controller of a rotating machine that is an in-vehicle prime mover.

Figure 1:
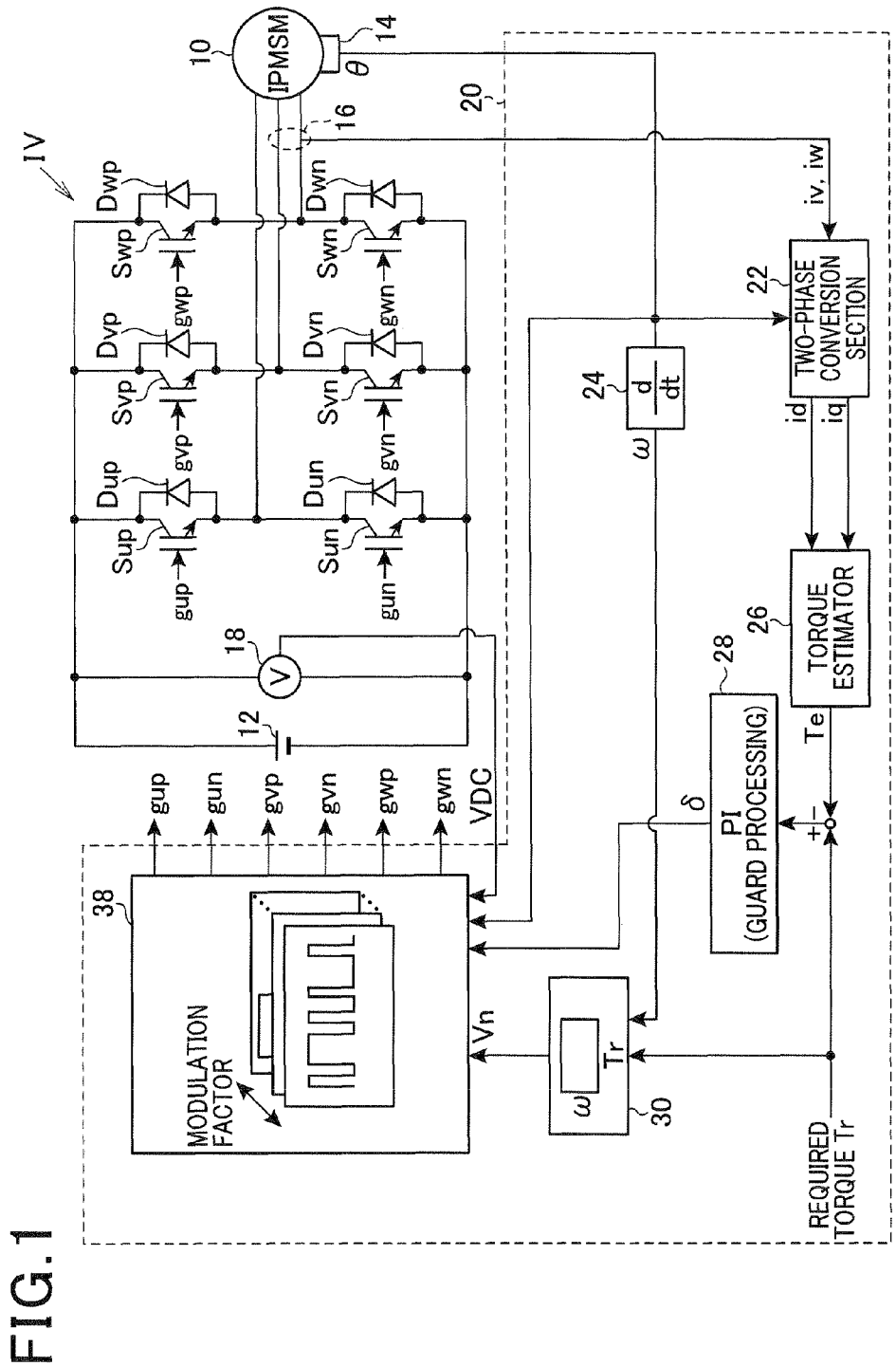
FIG. 1 shows a system configuration diagram of a first embodiment.

An overall configuration of a control system of a motor-generator regarding the present embodiment is shown in FIG. 1.

A motor-generator 10 as an in-vehicle prime mover is a three-phased permanent magnet synchronous motor, Moreover, the motor-generator 10 is a rotating machine (salient pole machine) that has salient poles.

To be more specific, the motor-generator 10 is an interior permanent magnet synchronous motor (IPMSM).

The motor-generator 10 is connected to a high-voltage battery 12 via an inverter IV, which is a voltage applying circuit.

The inverter IV is provided with three sets of series-connected bodies of switching elements S*p and S*n (*=u, v, w), and connecting points of respective series-connected bodies are connected to respective U, V, and W phase of the motor-generator 10.

An insulated gate bipolar transistor (IGBT) is used as the switching elements S*# (*=u, v, w; #=n, p) in the present embodiment.

Moreover, diodes D*# are connected to the switching elements in inverse-parallel connection.

In the present embodiment, the following is provided as a detection means that detects a condition of the motor-generator 10 and the inverter IV.

First, there is provided a rotation angle sensor 14 that detects a rotation angle of the motor-generator 10 (an electrical angle θ).

Moreover, there is provided a current sensor 16 that detects currents iv and iw that flow through V phase and W phase of the motor-generator 10.

Furthermore, there is provided a voltage sensor 18 that detects an input voltage (power supply voltage VDC) of the inverter IV.

Detected values of the various sensors mentioned above are inputted into a controller 20 that constitutes a low-voltage system via an interface (not shown).

Operating signals that controls signals that control the inverter IV are generated and outputted based on the detected values of the sensors in the controller 20.

Here, the signals that operate the switching elements S*# of the inverter IV are operating signals g*#.

The controller 20 operates the inverter IV so that torque of the motor-generator 10 is controlled to be a required torque Tr.

Hereafter, the operation mentioned above is explained.

A two-phase conversion section 22 converts the currents iv and iw detected by the current sensor 16 into an actual current id of a d axis and an actual current iq of a q axis that are currents of a system of rotating axes.

On the other hand, the speed calculation part 24 computes an electrical angular velocity ω based on the electrical angle θ detected by the rotation angle sensor 14.

A torque estimator 26 as a torque detection means computes an estimated torque Te of the motor-generator 10 by considering the actual currents id and iq as inputs.

This processing may be computed by using a map that stores a relation between the actual currents id, iq and the torque, and may be computed using a model formula.

A phase setting section 28 as a phase control means sets a phase δ based on a difference between the required torque Tr and the estimated torque Te as a controlled variable for a feedback control of the estimated torque Te to the required torque Tr.

In detail, the phase δ is computed as a sum of the output of the proportional controller, which takes into account the difference between the required torque Tr and the estimated torque Te as an input, and the output of an integrating controller.

To be more specific, guard processing, which limits the phase, is applied to an output value (phase δ) and the integrating controller in the phase setting section 28.

Figure 2:
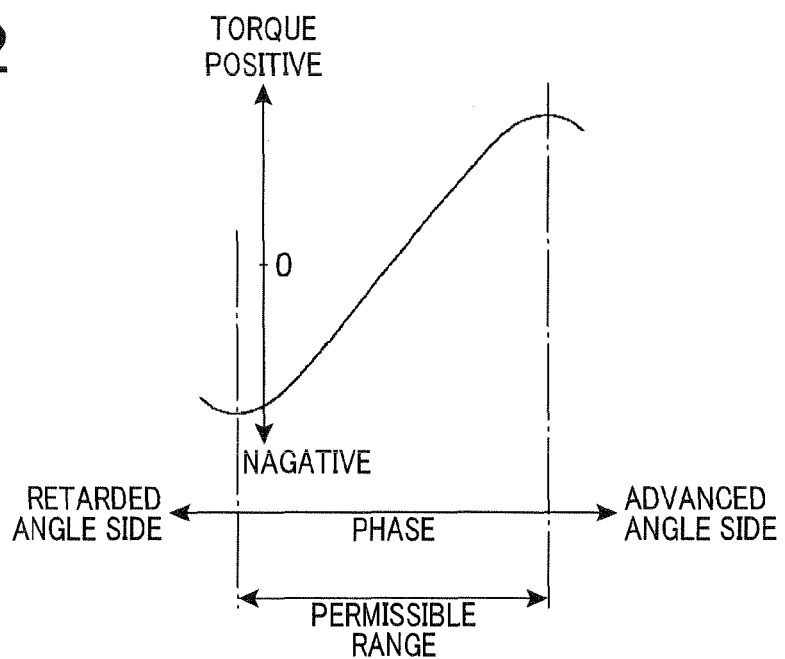
FIG. 2 shows a figure showing an operation phase tolerance level of the first embodiment.

That is because, although there is a corresponding relation of 1 to 1 between the phase δ of the output voltage vector of the inverter IV and the torque of the motor-generator 10 by limiting the phase δ to the region that is specified with a dashed line, as shown in FIG. 2, this relation breaks down outside this region.

That is, a plurality of phases δ that can generate the same torque will exist.

For this reason, the phase δ is limited to a suitable value for controlling torque by performing guard processing on the phase δ and limiting the phase δ to the phase operable range in the phase setting section 28 shown in FIG. 1.

On the other hand, a norm setting section 30 as a norm setting means sets a norm Vn of the output voltage vector of the inverter IV by considering the required torque Tr and the electrical angular velocity ω as inputs.

In detail, the norm Vn is set by providing a map that defines the relation between the norm Vn and the required torque Tr and electrical angular velocity ω in the norm setting section 30.

This norm Vn is set to a value that can realize a minimum current maximum torque control in the present embodiment.

Further, in an operation signal generating section 38, operation signals g*# are generated and outputted based on the phase δ that is set in the phase setting section 28, the norm Vn that is set in the norm setting section 30, the power supply voltage VDC, and the electrical angle θ.

Specifically, the operation signal generating section 38 stores an operation signal waveform for a single rotation cycle of the electrical angle as map data for every modulation factor.

The modulation factor is computed based on the power supply voltage VDC and the norm Vn in the operation signal generating section 38, and an applicable operation signal waveform is selected according to the computed modulation factor.

Here, an upper limit of the modulation factor is set to 1.27 that is a modulation factor at the time of a square wave control.

For this reason, when the modulation factor becomes a maximum value of 1.27, a waveform (a single pulse waveform) is chosen as an operation signal waveform where a period that turns on the switching elements S*p in a high potential side to an ON state and a period that turns on the switching element S*m in a low potential side to an ON state at the time of the single rotation cycle of the electrical angle that is a waveform at the time of rectangle wave control become once for respective period.

When the operation signal waveform is selected in this way, the operation signal is generated in the operation signal generating section 38 by setting up an output timing of the waveform based on the phase δ that the phase setting section 28 sets.

By using the operation signals g*# mentioned above, the torque of the motor-generator 10 can be controlled to the required torque Tr by minimum current maximum torque control.

However, when decreasing of the magnetic flux of a permanent magnet, or demagnetization occurs, various problems such as a fall in efficiency of the motor-generator 10 arise.

Therefore, the present embodiment considers that the phase δ set by the phase setting section 28 differs in the case where demagnetization occurs and is not arisen, abnormalities that the magnetic flux of the permanent magnet of the motor-generator 10 decreases are detected, and when it is determined that there is an abnormality, it is notified externally (an abnormality determination means).

Next, a reason why the phase δ differs by the existence of demagnetization is explained using following equations (c1) and (c2) that express the voltage equations of IPMSM.

In the following equations, a d axis inductance Ld, a q axis inductance Lq, a resistance R, an armature interlinking magnetic flux constant φ, and a differential operator p are used.

$$vd=(R+pLd)id-\omega Lqiq \quad (c1)$$

$$vq=\omega Ldid+(R+pLq)iq+\omega\phi \quad (c2)$$

In the above-mentioned formula (c1) and (c2), under the situation where the motor-generator 10 is rotating, and if a stationary state is assumed, a term of the differential operator p can be set to zero, and if a term of the resistance R is disregarded, the following formulas (c3) and (c4) are obtained.

$$vd=-\omega Lqiq \quad (c3)$$

$$vq=\omega Ldid+\omega\phi \quad (c4)$$

Here, the norm of the output voltage vector of the inverter IV is unambiguously set according to the required torque Tr and the electrical angular velocity ω.

Further, when demagnetization occurs, the current that can be sent becomes large since the armature interlinkage magnetic flux constant φ becomes small even if the norms are the same.

Specifically, the current id of d axis increases when demagnetization occurs according to the formula (c4).

In addition, it is determined in this case that torque is smaller than the required torque Tr in the torque estimator 26.

That is, the relation between current and torque is expressed by a following formula (c5).

$$T=P\{\phi iq+(Ld-Lq)idiq\} \quad (c5)$$

Here, since [Ld−Lq] is negative in an IPMSM, the estimated torque Te will become small when the current of the d axis is negative and the absolute value decreases, or it just changes from negative to positive.

For this reason, in order to control the estimated torque Te to the required torque Tr, an advanced angle operation of the phase δ is performed at the time of power running, and a retarded angle operation of the phase δ is performed at the time of regeneration.

In addition, the armature interlinkage magnetic flux constant φ here is a constant value that does not change irrespective of the existence of demagnetization.

Figure 3:
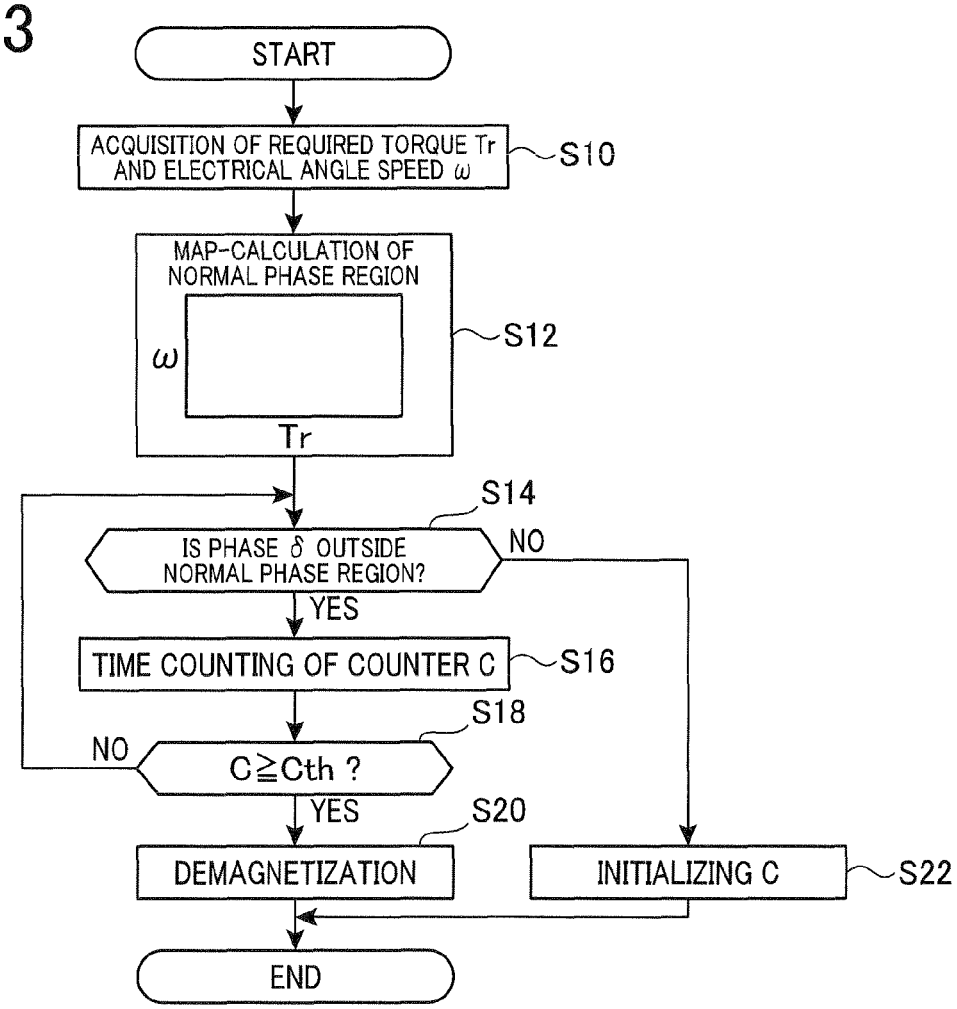
FIG. 3 shows a flow chart showing a procedure of a determination process detecting existence of demagnetization of the first embodiment.

A procedure of a process of determining the existence of demagnetization regarding the present embodiment is shown in FIG. 3.

This process is repeatedly performed by the controller 20 for a predetermined cycle, for example.

In a series of processes, the required torque Tr and the electrical angle speed ω are first acquired in step S10.

In step S12 (a region setting means), a range (normal phase region) that can be assumed when demagnetization has not occurred in the permanent magnet of the motor-generator 10 is computed regarding the phase δ set by the phase setting section 28.

In the present embodiment, a map calculation of the normal phase region is performed using a map that defines the relation between the required torque Tr and electrical angular velocity ω, and the normal phase region.

Here, a reason for using the required torque Tr and electrical angular velocity ω as the normal phase region is explained.

Figure 4:
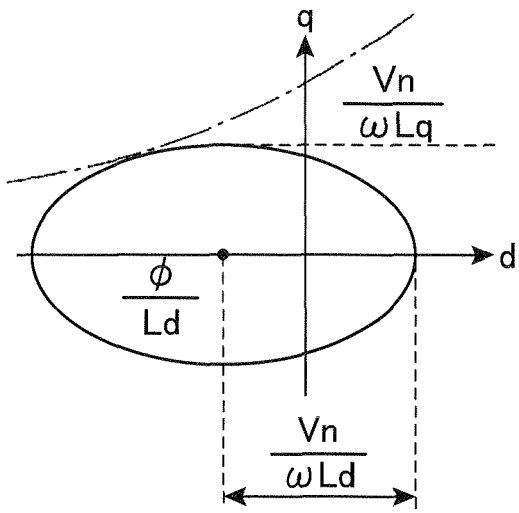
FIG. 4 shows a figure for explaining a setting of a normal phase region of the first embodiment.

According to the formula (c3) and (c4) mentioned above, assuming a square of the norm Vn of a voltage vector (vd, vq) to a constant value, the current id of the d axis and the current iq of the q axis become values on an ellipse in a solid line shown in FIG. 4.

Sizes of a major axis and a minor axis of the ellipse become [Vn/ωLd] and [Vn/ωLq], respectively, and change not only depending on the norm Vn but depending on the electrical angular velocity ω.

Moreover, a torque curves in a case where the torque T is set constant in the formula (c5) becomes an upward curve, as a dashed line shown in FIG. 4.

Here, since it is thought that the phase δ set by the phase setting section 28 becomes an intersection of the ellipse defined by the norm Vn and the equal torque curve, the phase δ becomes defined according to the norm Vn, the electrical angular velocity ω, and the torque.

Therefore, the normal phase region can be defined by specifying the norm Vn, the electrical angular velocity ω, and the torque.

However, in the present embodiment, the normal phase region is set from the electrical angular velocity ω and the required torque Tr since the norm Vn is set unambiguously from the required torque Tr and the electrical angular velocity ω in the norm setting section 30.

When the process of step S12 shown in FIG. 3 is completed, the process moves to step S14.

In step S14, it is determined whether the phase δ is outside the normal phase region or not.

If it is determined YES in step S14, time counting of a counter C that counts time for the phase δ to be departed from the normal phase region is performed in step S16.

Then in step S18, it is determined whether a value of the counter C is more than the threshold value Cth or not.

This process is for deciding whether demagnetization occurs in the permanent magnet of the motor-generator 10 or not.

That is, when the phase δ is departed over the time more than the threshold value Cth from the normal phase region, it can be determined that the phenomenon that the phase δ departs from the normal phase region dose not result from a transient operation, and it can be determined that it depends on demagnetization of the permanent magnet.

In other words, under the situation where the norm Vn set by the norm setting section 30 is set constant, it is considered that it is operated by the suitable phase δ when setting the estimated torque Te into the required torque Tr in the norm Vn.

In addition, the threshold value Cth is set to a larger value than when the phase δ is outside the normal phase region due to a transient operation and is therefore able to continue.

If it is determined NO in step S18, the process returns to step S14, while if it is determined YES in step S18, it is determined that demagnetization occurs in the permanent magnet in step S20, and notifies a user of the result.

On the other hand, if it is determined NO in step S14, the counter C is initialized in step S22.

In addition, when the process of steps S20 and S22 mentioned above is completed, the series of the process is complete.

According to the present embodiment explained in full detail, the following effects can be acquired.

(1) It is determined that demagnetization occurs in the permanent magnet based on the phase δ controlled by the phase setting section 28 outside the normal phase region.
Thereby, the existence of demagnetization of the permanent magnet can be determined appropriately.

<Second Embodiment>

Hereafter, the second embodiment of the present disclosure is explained referring to drawings focusing on differences with the first embodiment.

As mentioned above, the phase δ is limited to the operable range by applying the guard processing to the phase δ in the phase setting section 28.

Here, when maintaining the controllability of the motor-generator 10, it is desirable to design it so that the operation of the phase δ in the advanced angle side and the retarded angle side becomes possible by defining a boundary of the normal phase region inside a boundary of the operable range.

Thereby, the phase δ can be retarded angle operated or advanced angle operated according to whether the estimated torque Te is larger than the required torque Tr or is smaller, However, even if the phase δ is designed so, there is a possibility that the phase δ will depart from the normal phase region and may be set constant at the boundary value of the operable range when demagnetization occurs.

By considering this point in the present embodiment, it is determined whether demagnetization occurs based on a fact that the situation where the phase δ being a boundary value of the operable range is not resulting from a transient phenomenon.

Figure 5:
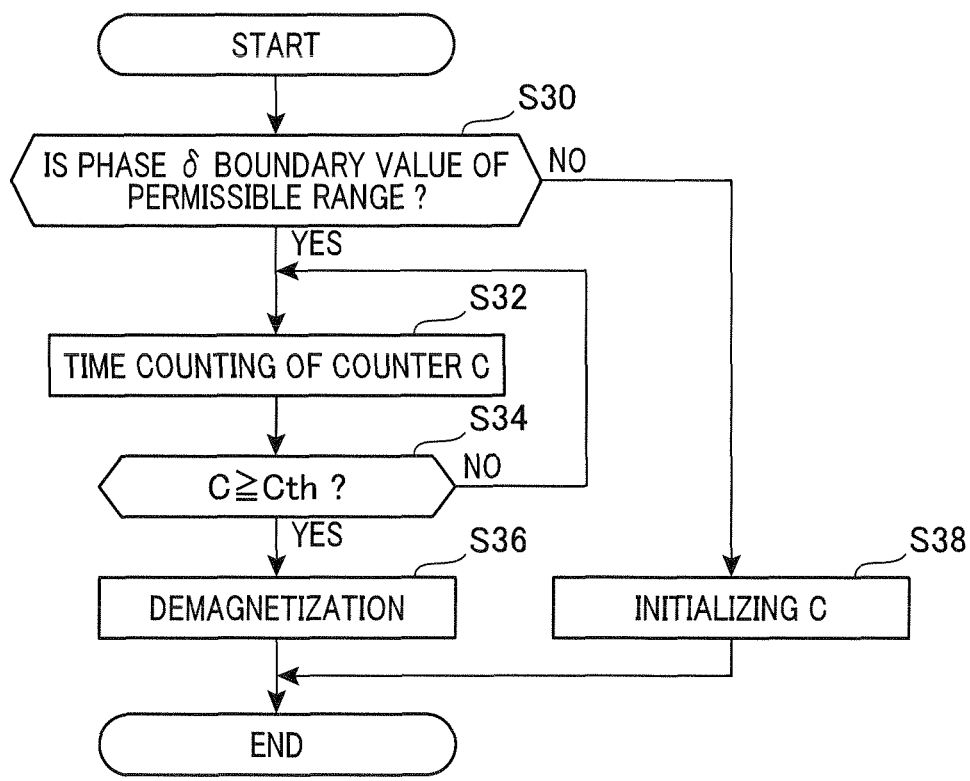
FIG. 5 shows a flow chart showing a procedure of a determination process detecting existence of demagnetization of a second embodiment.

A procedure of a process of determining the existence of demagnetization regarding the present embodiment is shown in FIG. 5.

This process is repeatedly performed by the controller 20 for a predetermined cycle, for example.

In a series of the process, it is first determined in step S30 whether the phase δ is a border value of the operable range or not.

If it is determined YES in step S30, time counting of a counter C that counts time for the phase δ to be the boundary value of the operable range is performed in step S32.

Then in a following step S34, it is determined whether a value of the counter C is more than the threshold value Cth or not.

This processing is for deciding whether the situation where the phase δ being the boundary value of the operable range is resulting from the transient operation or not.

If it is determined NO in step S34, the process returns to step S32, while if it is determined YES in step S34, it is determined that demagnetization occurs in the permanent magnet in step S36, and notifies a user a result.

On the other hand, if it is determined NO in step S30, the counter C is initialized in step S38.

In addition, when the process of steps S36 and S38 mentioned above is completed, the series of the process is once ended.

According to the present embodiment explained in full detail, following effects can be acquired.

(2) It is determined that demagnetization occurs in the permanent magnet based on the phase δ set by the phase setting section 28 remaining in the boundary value of the permissible range.
Thereby, the existence of demagnetization of the permanent magnet can be determined appropriately.

<Other Embodiments>

It should be appreciated that each embodiment mentioned above may be modified and performed as follows.

<Regarding a Norm Setting Means>

As for a norm setting means, the norm Vn is not limited to what is defined unambiguously from the required torque Tr and the electrical angular velocity ω.

For example, the norm Vn may be defined unambiguously according to the required torque Tr, the electrical angular velocity ω, and the temperature of the motor-generator 10.

As for a norm setting means, the norm Vn is not limited to what is set as an amount of an open-loop operation of the required torque Tr.

For example, a final norm may be a norm revised by the open-loop control by the controlled variables for feedback-controlling of the actual currents id of the d axis to the command current idr.

Even in such a case, since the norm is set constant when the square wave control is performed and the situation where variable operation of the phase δ is performed for the control to the required torque Tr may arise, the existence of demagnetization can be determined at this time based on the phase δ.

In addition, if the open-loop control is applied for realizing the required torque Tr by the minimum current maximum torque control, for example, the command current idr becomes a current that can realize the required torque Tr by minimum current maximum torque control, Regarding a norm setting means not limited to the above, refer to the following section <Regarding a phase control means>.

<Regarding a Phase Control Means>

As for a phase control means, the phase δ is not limited to being used as a direct operational parameter.

For example, the direct operational parameter for the torque feedback control may be a command current of the q axis like an over-modulation controller disclosed in Japanese Patent Application Laid-Open Publication No. 2010-11600.

Even in such a case, since the command voltage of the d axis set as controlled variables for feedback-controlling the command current of the q axis to the actual currents and the norm beforehand determined as the command voltage of the d axis are defined unambiguously, the phase δ is controlled by the torque feedback control.

In the composition mentioned above, since the command current of the q axis as the controlled variables for torque feedback control changes when the magnetic flux of the permanent magnet decreases, it is considered that the command voltage of the d axis for feedback-controlling the current of the q axis to be equal to the command current is different from that at the normal time, thus the phase δ is different from that in the normal phase region.

<Regarding a Region Setting Means>

Input parameters are not limited to be the required torque Tr and the electrical angle speed ω.

For example, the input parameters may be the norm Vn of the output voltage vector and the electrical angular velocity ω.

Even in such a case, since the norm Vn is unambiguously set by the norm setting section 30 according to the required torque Tr and the electrical angular velocity ω, it is considered that the normal region can be set with high precision.

Moreover, for example, when determining the existence of abnormalities based on the phase of the command voltage at the time of over-modulation control disclosed in Japanese Patent Application Laid-Open Publication No. 2010-11600, it is desirable to set the input parameters to the norm Vn of the required torque Tr, the output voltage vector and the electrical angular velocity ω.

In addition, the unambiguous relation between the required torque Tr and the electrical angular velocity ω, and the norm Vn breaks down when setting the norm Vn unambiguously according to the required torque Tr, the electrical angular velocity ω, and the temperature of the motor-generator 10 as disclosed in the above <regarding norm setting means> section.

For this reason, although it is desirable to set the input parameters to the required torque Tr, the norm Vn of the output voltage vector and the electrical angular velocity ω, or to the required torque Tr, the electrical angular velocity ω and the temperature, it is also possible to set the input parameters approximately to the required torque Tr and the electrical angular velocity ω.

<Regarding an Abnormality Determination Means>

For example, in the first embodiment mentioned above, a process that determines whether to use the advanced angle side or the retardation side from the normal region according to whether it is a power running or it is a regenerating may be provided.

Then, the result of the determination can be used as conditions for determining that demagnetization occurs when it is in the advanced angle side from the normal phase region at the time of power running and in the retardation angle side from the normal phase region at the time of regenerating.

Similarly, in the second embodiment, a process that determines whether to use a boundary of the operable range by the advanced angle side or it becomes a boundary of the operable range by the retardation angle side according to whether it is a power running or it is a regenerating may be provided.

Then, the result of the determination may be used as conditions for determining that demagnetization occurs when it is the boundary of the advanced angle side at the time of power running or is the boundary of the retardation angle side at the time of regenerating.

However, when using what is [Ld>Lq] as the rotating machine, torque may become large by performing retarded angle operation of the phase.

In such a case, the result of the determination may be used as conditions for determining that demagnetization occurs when it is in the retardation angle side relative to the normal phase region at the time of power running and in the advanced angle side from the normal phase region at the time of regenerating, for example.

In addition, such a rotating machine is disclosed in Japanese Patent Application Laid-Open Publication No. 2006-81338, for example.

<Regarding an Abnormality Determination Condition>

As for the abnormality determination condition, it is not limited to a condition that a state is departed from the normal phase region or set constant to the boundary of permissible range that continues more than threshold time (condition that the counter C becomes more than the threshold value Cth).

For example, although the amount of the change of the output of the integrating controller is below a required value, it is acceptable also to consider the amount by which the phase is outside the normal region as a condition.

Furthermore, the situation where the norm Vn is set constant is not limited to situations in which the motor-generator is operating steadily as mentioned above, but it is also acceptable to determine directly that the amount of the change of the norm Vn is below a required value as a condition.

In addition, it is not limited to setting the norm Vn as a direct input parameter as a means for determining the amount of the change of the norm Vn becoming below in the required value, but it is also acceptable to set as the input parameter the parameter (the required torque Tr and the electrical angular velocity ω) for setting up the norm Vn.

That is, if the amounts of the changes are below the value set beforehand, it is considered that the amount of the change of the norm Vn is below the required value.

<Regarding a Method for an Abnormality Determination>

A situation may arise where demagnetization in each above-mentioned embodiment arises only temporarily. Then the determination that demagnetization has truly occurred may be decided by the accumulated temporary determinations of demagnetization.

In this case, when the phase δ is determined to be normal (steps S14, S30: NO) while the number of times that temporary determination is made is less than a required value, what is necessary is just to reset a log of the temporary abnormalities.

In addition, although the user may be notified of the temporary abnormality determination when it is made, the user may alternatively be notified only when the case that the abnormality determination is definitely decided.

<Regarding a Voltage Applying Circuit>

This circuit is not limited to an AC-DC bi-directional converter (inverter IV) as a voltage applying circuit.

For example, it may be a converter connected to each terminal of a rotating machine as disclosed in Japanese Patent Application No. 2008-30825.

<Regarding a Torque Detection Means of a Rotating Machine>

The torque detection means of the rotating machine is not limited to the one that detects a current that flows through the rotating machine as an input.

For example, it may be a means to contact a rotation shaft of the motor-generator 10 and a means to directly detect the torque.

<Regarding the Rotating Machine>

It is not limited to be used as the in-vehicle prime mover as a rotating machine.

For example, it may be a rotating machine etc. that is disposed in a power steering system.

<Others>

It is not limited to the high-voltage battery 12 as a direct-current power supply connected to the input terminal of the inverter IV.

For example, a converter CV that boosts the voltage of the high-voltage battery 12 may be provided between the high-voltage battery 12 and the inverter IV, and may be used as the direct-current power supply.

What is claimed is:

1. A rotating machine controller that feedback-controls a torque of the rotating machine to a required torque by operating a voltage applying circuit that applies voltage to the rotating machine equipped with a permanent magnet comprising:
    a norm setting means that sets a vector norm of an output voltage of the voltage applying circuit;
    a phase control means that controls a phase of the output voltage of the voltage applying circuit so that a torque of the rotating machine is feedback-controlled to the required torque;
    an abnormality determination means that determines whether abnormalities arise in a magnetic flux of the permanent magnet based on the phase controlled by the phase control means; and
    a region setting means that sets a normal region of the phase controlled by the phase control means using at least two parameters among the vector norm of the output voltage, a revolving speed of the rotating machine, and the required torque as inputs;
    wherein, the abnormality determination means determines that the abnormalities are arisen in the magnetic flux of the permanent magnet based on the phase controlled by the phase control means departing from the normal region.

2. The rotating machine controller according to claim 1, wherein, the voltage applying circuit is an AC-DC bi-directional converter disposed with switching elements that connect terminals of the rotating machine to a positive pole and a negative pole of a direct-current power supply alternately.

3. A rotating machine controller that feedback-controls a torque of the rotating machine to a required torque by operating a voltage applying circuit that applies voltage to the rotating machine equipped with a permanent magnet comprising:
    a norm setting means that sets a vector norm of an output voltage of the voltage applying circuit;
    a phase control means that controls a phase of the output voltage of the voltage applying circuit so that a torque of the rotating machine is feedback-controlled to the required torque; and
    an abnormality determination means that determines whether abnormalities arise in a magnetic flux of the permanent magnet based on the phase controlled by the phase control means;
    wherein, the rotating machine controller has a limiting means that limits the phase, using the phase control means, to be within a permissible range; and
    the abnormality determination means determines that abnormalities have arisen in the magnetic flux of the permanent magnet if the phase controlled by the phase control means remains at a boundary value of the permissible range.

4. The rotating machine controller according to claim 3, wherein, the voltage applying circuit is an AC-DC bi-directional converter disposed with switching elements that connect terminals of the rotating machine to a positive pole and a negative pole of a direct-current power supply alternately.

5. A rotating machine controller that feedback-controls a torque of the rotating machine to a required torque by operating a voltage applying circuit that applies voltage to the rotating machine equipped with a permanent magnet comprising:
    a norm setting means that sets a vector norm of an output voltage of the voltage applying circuit;
    a phase control means that controls a phase of the output voltage of the voltage applying circuit so that a torque of the rotating machine is feedback-controlled to the required torque; and
    an abnormality determination means that determines whether abnormalities arise in a magnetic flux of the permanent magnet based on the phase controlled by the phase control means;
    wherein, the abnormality determination means determines that abnormalities have arisen in the magnetic flux if the norm set by the norm setting means is substantially constant.

6. The rotating machine controller according to claim 5, wherein, the voltage applying circuit is an AC-DC bi-directional converter disposed with switching elements that connect terminals of the rotating machine to a positive pole and a negative pole of a direct-current power supply alternately.

* * * * *